Oct. 10, 1961     R. A. GILMOUR     3,003,792
FLEXIBLE HOSE COUPLER WITH ROTATIONAL CAM
Filed April 14, 1959
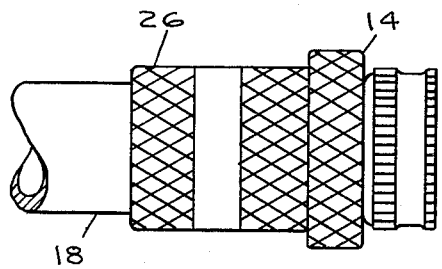
FIG. 1
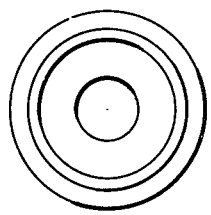
FIG. 2
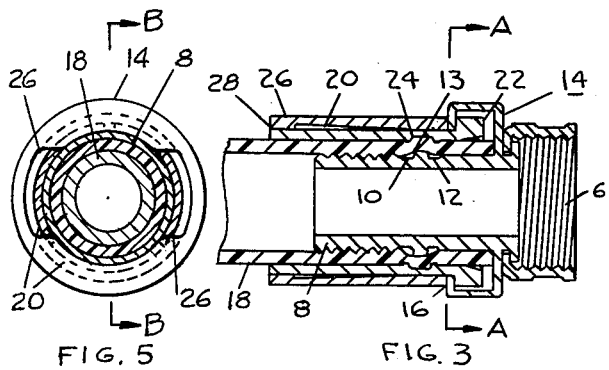
FIG. 5
SECTION A-A
FIG. 3
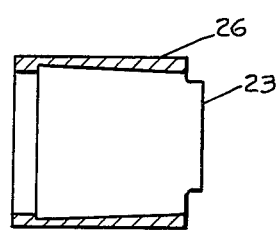
FIG. 6
SECTION B-B
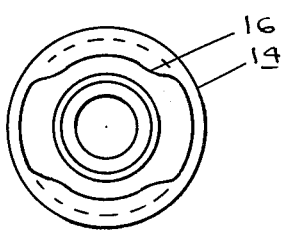
FIG. 4
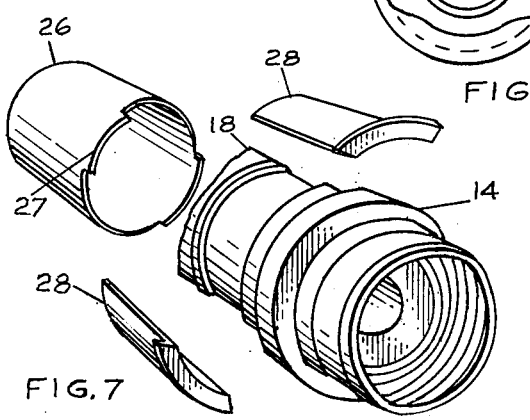
FIG. 7
*INVENTOR.*
ROBERT A. GILMOUR
BY
ATTORNEY

3,003,792
FLEXIBLE HOSE COUPLER WITH ROTATIONAL CAM
Robert A. Gilmour, Box 70, Somerset, Pa.
Filed Apr. 14, 1959, Ser. No. 806,258
1 Claim. (Cl. 285—81)

My invention relates to coupling devices and more particularly to a device for coupling a hose of flexible material to a rigid coupling device.

In accordance with the prior art of which I am aware, coupling devices for coupling a hose have been built comprising a threaded metallic piece having an appendage thereon which is generally cylindrical in shape and which is modulated by a plurality of exterior annular ridges. The appendage is constructed to be inserted inside the end of a length of hose. When the end of the hose is inserted over the appendage an annular clamp is placed around the hose which has a bolt there-thru and a nut for tightening the clamp so as to exert pressure to tighten the hose against the appendage.

The prior art device has been found to be cumbersome to work with, is difficult to reuse and does not fasten the hose tight enough to hold it fast under heavy water pressure.

It is accordingly an object of my invention to provide an improved coupling.

It is another object of my invention to provide an improved coupling for coupling a flexible hose to a rigid object which will hold the hose firmly in place.

It is still another object of my invention to provide a coupling for coupling a flexible hose to a rigid coupling device which may be readily disassembled and reused.

It is another object of my invention to provide a hose coupler with a simple locking mechanism.

It is an ancillary object of my invention to provide a new and useful article of manufacture.

In accordance with my invention, I provide a coupling device having a hose adapter coupling which comprises partially threaded cylindrical portion with an axial cylindrical appendage attached thereto and forming a part thereof, which appendage is of substantially smaller cross section than said partially threaded cylindrical portion. A short distance from the threaded cylinder along the appendage, I provide two annular grooves of sufficient length to allow a hose of flexible material to be bent into it. The said grooves are separated by an annular ridge extending above the surface of the appendage. Around the appendage I provide a coupling ring or retaining ring which is partially of bayonet shaped cross section. A length of hose is inserted over the appendage and under a portion of the ring. A segmented compression ring preferably of two segments is inserted with one end under the retaining ring. The segmented compression ring has an annular interior groove corresponding to the exterior annular ridge on the adapter appendage. The segments of the compression ring are pressed tight against the hose and a compressor sleeve is slid over them. The compressor sleeve has a plurality of projections thereon extending parallel to the axis of the sleeve and extending into openings in the side of the retaining ring so that the sleeve is prevented from rotating. The compressor sleeve holds the segments of the compression ring in place and keeps them pressed down against the hose. By means of the leverage exerted by rotation of the retaining ring and by pressure exerted by the compressor sleeve against the ends of the segments a large pressure is exerted against the hose pressing it against the adapter coupling appendage. The hose is thus held tight and cannot be removed even under extreme tension or water pressure.

The novel features that I consider characteristic of my invention are set forth with particularity in the appended claim. The invention itself, however, both as to its organization and its method of operation, together with additional objects and advantages thereof, will best be understood from the following description when read in connection with the accompanying drawing in which:

FIGURE 1 is an elevational view of apparatus in accordance with the preferred embodiment of my invention.

FIGURE 2 is an end view of the apparatus shown in FIGURE 1 looking from the right.

FIGURE 3 is a showing in section of the apparatus shown in FIGURE 1 taken along the line A—A of FIGURE 1.

FIGURE 4 is an end view of the retaining ring and coupling cylinder shown in FIGURE 3 looking from left.

FIGURE 5 is a showing in perspective of the axial projections at the end of the retaining sleeve in locking engagement.

FIGURE 6 is a showing in cross section of apparatus in accordance with my invention showing the construction of separate segments of the compression ring.

FIGURE 7 is an exploded view of the apparatus shown in FIGURE 3 shown in perspective.

In accordance with my invention I provide a hose adapter coupling comprising a partially threaded cylindrical portion of metallic material, such as brass, having interior threads for coupling to the exteriorly threaded coupling on another hose, or in accordance with another embodiment of my invention being exteriorly threaded for coupling with an interiorly threaded device. Connected to the partially threaded portion 6 of the hose adapter coupling and forming a part thereof, is a substantially cylindrical appendage 8 of smaller exterior diameter than the diameter of the threaded portion. Approximately three-sixteenths of an inch along the appendage from the larger diameter threaded portion 6 of the adapter I provide two grooves 10, 12 approximately one-sixteenth of an inch deep and approximately one quarter of an inch long, the said grooves 10, 12 extending in an annular manner around said appendage 8. The grooves 10, 12 on the cylindrical appendage 8 are separated by an annular ridge 13 which extends outward slightly above the surface of the main body of the cylindrical appendage 8. Around the appendage 8, and adjacent to the larger diameter threaded portion 6, I provide a retaining ring 14 of bayonet shaped cross section whereby one side of the ring is substantially a washer fitting closely about the appendage 8 near the larger threaded portion 6 of the adapter coupling. The other side of the retaining ring 14 extends inward slightly in an annular flange to form a lip 16 for retaining an object inserted thereunder.

The hose adapter coupling appendage 8 is inserted into a hose 18 of the flexible material type until the hose 18 extends under the lip 16 of the bayonet shaped retaining ring 14 and against the washer wall of the retaining ring 14.

A segmented compression ring 20 is provided, comprising preferably two segments. Each of these segments has an outward projection 22 at one end called the retaining end which projection 22 slips under the lip 16 of the retaining ring 14 so as to engage, and be held fast by the retaining ring. A short distance from the retaining end of each of the compression ring segments there is an inward groove 24 which with both segments together produces substantially interior annular groove, the inward groove 24 being located opposite the ridge 13, on the appendage 8 of the hose adapter coupling. The segmented compression ring 20 is substantially a hollow cylinder except for the projections 22 and the groove 24. The projections 22 on the compression ring segments 20 extend in an annular manner preferably around the segments a distance equal to no more than half the curvilinear width of each of the segments and are preferably located midway between the sides of each of the segments.

A slip ring compressor sleeve 26 is provided which has a projection which is bevelled or has a wedge shaped cross section near one end. The slip ring compressor sleeve 26 is slid over the compression ring segments 20 so as to force them tightly against the hose and to hold them in place.

The slip ring compressor sleeve comprises a hollow cylindrical piece having projections 27 at one end which are generally of rectangular shape and are of substantially the same thickness and curvature as the main body of the cylindrical piece. These linear projections on the sleeve extend co-axial with the main body of the sleeve. The sleeve projections are preferably three-sixteenths of an inch long. Measured in the annular direction around the main body of the sleeve, the projections extend approximately one-fourth of the circumference of the sleeve. Approximately one-sixteenth of an inch from the end of the projections they are bevelled on the inside so as to present an inclined plane with the point toward the end of the projections. This bevel facilitates slipping the sleeve into position.

When the slip ring compressor sleeve is placed over the segmented compression ring segments 20 and the projections 27 of the sleeve 26 are slipped under the thinner portions of the lip 16 of the retaining ring 14, the sleeve is prevented from rotating. At the end of the sleeve 26 opposite to the linear projection 27 an inward annular projection 28 is provided which is bevelled so as to present an inclined plane toward the main body of the sleeve. This annular ridge on the inside of the sleeve 26 is preferably between a sixteenth and a thirty-second of an inch thick as measured perpendicular to the axis of the sleeve.

Near the end of the coupling cylinder which is opposite the end at which the retaining ring is located I provide exterior threads for forcing the hose over the ridge on the coupling cylinder.

I have thus provided a hose coupling apparatus whereby pressure is applied to retain the hose by means of a cam action thru rotation of the retaining ring with respect to the compression ring 20 and by means of leverage produced through the action of the lip of the retaining ring 14, the projection on the cylindrical appendage 8, and the interior annular projection on the compressor sleeve.

In the operation of my device, the end of the hose or other flexible conduit is slid over the cylindrical coupling 8 past the annular ridge between the two grooves 10, 12 on the coupling cylinder and under the lip 16 of the retaining ring. Since the retaining ring 14 is effectively a part of and is rigidly connected to the coupling cylinder, rotation of the retaining ring rotates the coupling cylinder. As the coupling cylinder is rotated with respect to the hose the threads on the coupling cylinder cause the hose to move axially along the coupling cylinder to the retaining ring.

When the hose is in place each of the segments of the compressor sleeve 20 are slipped under the retaining ring so that the external projections on the ends of the segments of the segmented compression ring are under the retaining ring opposite the open portion of the retaining ring where there is no lip. The retaining ring which is connected directly to the coupling cylinder is rotated with one hand while the segmented compression ring is held stationary with the other hand. The retaining ring is rotated 90 degrees with respect to the compression ring. The projections on the end of the segmented compression ring then lie behind the lips on the retaining ring so that they may not slide out axially. The sleeve is now slid over the segmented compression ring until the projections on the sleeve are under the open regions on the retaining ring where there is no lip.

As the sleeve is slid on axially over the segmented compression ring, the annular bevelled ridges at the end of the sleeve opposite to the end where the projections are located slide up on to the end of the segmented compression ring opposite to the end where the retaining ring is located, so as to force the ends of the segments of the compression ring inward toward the hose, thereby producing a leverage force against the hose in the region of the ridge on the compression ring.

When the projections on the end of the sleeve are under the edge of the retaining ring they are prevented from rotating by the lips on the retaining ring which are on either side of the axial projections on the sleeve. In turn the axial projections on the sleeve engage the lips on the segmented compression ring so as to prevent rotation of the sleeve with respect to the retaining ring. The segments of the segmented compression ring are now prevented from axial movement by the engagement between the lip of the retaining ring and the ridge on the end of the segments. The sleeve is prevented from axial movement by friction between the sleeve and the segmented compression ring.

In accordance with other embodiments of my invention the coupler is built double in a back-to-back manner. In this embodiment a cylinder is provided which is threaded at each end and a length of hose is screwed on each end. The retaining ring may be free to rotate in this embodiment and comprises cam lips on each edge thereof. Segmented compression rings are inserted under the retaining ring and the retaining ring is rotated with respect to the segmented compression rings and locked with compression sleeves in the manner taught in the preferred embodiment.

Although I have shown and described specific embodiments of my invention, I am aware that other modifications thereof are possible; my invention, therefore, is not to be restricted except insofar as is necessitated by the prior art and the spirit of the invention.

I claim as my invention:

In combination: A hollow cylindrical piece of rigid material, said hollow cylindrical piece having two annular grooves therein on the outside thereof separated by an annular ridge extending above the level of the main body of said piece; a retaining ring mounted on and encircling said piece, said retaining ring comprising a washer shaped section attached at its circumference to the edge of a cylindrical ring, circumferentially spaced inward radial projections on the inside of said ring near the edge of said ring opposite the edge where said washer is attached; a length of hose inserted over a portion of said cylindrical piece and against the washer portion of said retaining ring and under the cylindrical ring portion of said retaining ring, a segmented compression ring each segment having an outward flange near an end thereof, said flange being of a size to pass between said projections and fitting under the said cylindrical ring behind a projection when said compression ring and retaining ring are relatively rotated, a sleeve around said compression ring holding said compression ring clamped on said hose, said sleeve having an axial projection extending into and blocking the space between said projections under a portion of said cylindrical ring.

References Cited in the file of this patent

UNITED STATES PATENTS

| 409,066 | Ravenel | Aug. 13, 1889 |
| 2,132,506 | Allen | Oct. 11, 1938 |

FOREIGN PATENTS

| 737,252 | Germany | June 3, 1943 |
| 835,381 | Germany | Feb. 28, 1952 |